(12) United States Patent
Liu et al.

(10) Patent No.: US 10,827,321 B2
(45) Date of Patent: Nov. 3, 2020

(54) CONTROL INFORMATION TRANSMISSION METHOD AND APPARATUS

(71) Applicant: HUAWEI TECHNOLOGIES CO., LTD., Shenzhen (CN)

(72) Inventors: Jianqin Liu, Beijing (CN); Yongxing Zhou, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/274,200

(22) Filed: Feb. 12, 2019

(65) Prior Publication Data

US 2019/0182635 A1    Jun. 13, 2019

Related U.S. Application Data

(63) Continuation of application No. PCT/CN2017/097118, filed on Aug. 11, 2017.

(30) Foreign Application Priority Data

Aug. 12, 2016 (CN) .......................... 2016 1 0664258

(51) Int. Cl.
| | |
|---|---|
| *H04W 4/18* | (2009.01) |
| *H04W 28/06* | (2009.01) |
| *H04L 1/18* | (2006.01) |
| *H04L 1/00* | (2006.01) |
| *H04B 7/06* | (2006.01) |
| *H04L 5/00* | (2006.01) |
| *H04W 72/04* | (2009.01) |

(52) U.S. Cl.
CPC ............ *H04W 4/18* (2013.01); *H04B 7/0689* (2013.01); *H04L 1/0025* (2013.01); *H04L 1/0026* (2013.01); *H04L 1/0028* (2013.01); *H04L 1/1864* (2013.01); *H04L 5/0048* (2013.01); *H04W 28/06* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2012/0195267 | A1 | 8/2012 | Dai |
| 2013/0163573 | A1* | 6/2013 | Oizumi ................. H04L 5/0091 370/336 |

(Continued)

FOREIGN PATENT DOCUMENTS

| | | |
|---|---|---|
| CN | 101631374 A | 1/2010 |
| CN | 101692739 A | 4/2010 |

(Continued)

*Primary Examiner* — Anh Vu H Ly
(74) *Attorney, Agent, or Firm* — Kilpatrick Townsend & Stockton LLP

(57) ABSTRACT

The present invention discloses a control information transmission method and an apparatus. In one solution of the present invention, control information that is sent by a control information sending device is associated with one of at least two transmission schemes, and the control information includes information used to indicate a transmission scheme type, so that a control information receiving device can determine the corresponding transmission scheme based on the control information.

10 Claims, 4 Drawing Sheets

A control information sending device sends control information, where the control information is associated with a transmission scheme, and includes information used to indicate a transmission scheme type, a control information format used by the control information may include a first format and/or a second format, the first format is used to indicate control information of common system information, and the second format is used to indicate control information of a user dedicated channel — 201

A control information receiving device receives the control information sent by the sending device, and further performs corresponding processing based on the received control information — 202

(56) References Cited

U.S. PATENT DOCUMENTS

| | | | |
|---|---|---|---|
| 2014/0153554 A1* | 6/2014 | He | H04W 72/042 370/336 |
| 2014/0211710 A1* | 7/2014 | Guan | H04W 28/06 370/329 |
| 2014/0219213 A1 | 8/2014 | Ko et al. | |
| 2014/0269368 A1* | 9/2014 | Xu | H04L 5/0053 370/252 |
| 2014/0334395 A1* | 11/2014 | Lee | H04L 5/0053 370/329 |
| 2015/0327226 A1* | 11/2015 | Cheng | H04W 74/08 370/329 |
| 2016/0114563 A1* | 4/2016 | Underwood | B32B 15/08 428/35.9 |
| 2017/0171739 A1* | 6/2017 | Suzuki | H04W 8/24 370/329 |
| 2018/0063822 A1* | 3/2018 | Guo | H04W 72/0473 370/329 |
| 2018/0332566 A1* | 11/2018 | You | H04L 5/00 370/329 |
| 2019/0045488 A1* | 2/2019 | Park | H04B 7/0417 370/329 |
| 2019/0289582 A1* | 9/2019 | Seo | H04L 27/2613 370/329 |
| 2019/0387501 A1* | 12/2019 | Park | H04W 72/1273 370/329 |

FOREIGN PATENT DOCUMENTS

| | | |
|---|---|---|
| CN | 101754396 A | 6/2010 |
| CN | 101801101 A | 8/2010 |
| CN | 102355728 A | 2/2012 |
| CN | 102484520 A | 5/2012 |
| CN | 103024807 A | 4/2013 |
| CN | 105610549 A | 5/2016 |
| EP | 2712109 A1 | 3/2014 |
| WO | 2010081159 A1 | 7/2010 |
| WO | 2013071486 A1 | 5/2013 |
| WO | 2015139389 A1 | 9/2015 |

* cited by examiner

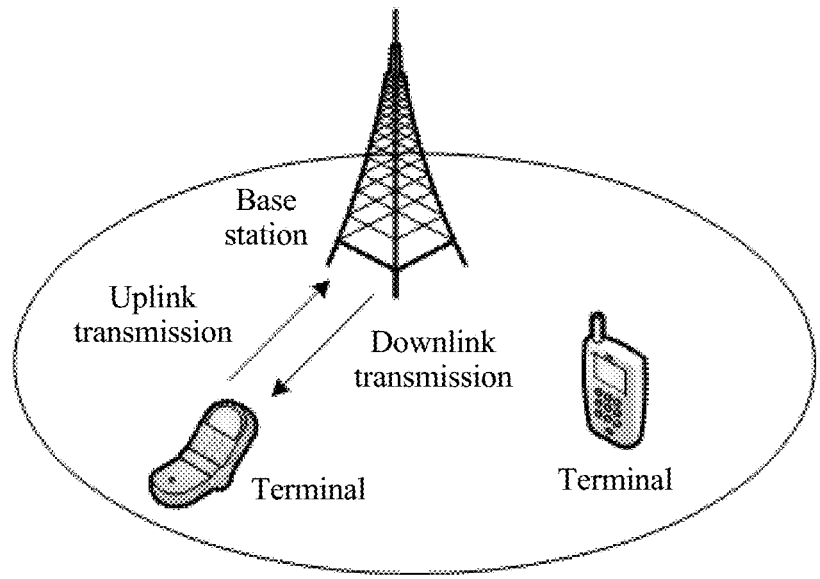

FIG. 1

A control information sending device sends control information, where the control information is associated with a transmission scheme, and includes information used to indicate a transmission scheme type, a control information format used by the control information may include a first format and/or a second format, the first format is used to indicate control information of common system information, and the second format is used to indicate control information of a user dedicated channel ⟵ 201

A control information receiving device receives the control information sent by the sending device, and further performs corresponding processing based on the received control information ⟵ 202

FIG. 2

CONTROL INFORMATION TRANSMISSION METHOD AND APPARATUS

CROSS-REFERENCE TO RELATED APPLICATIONS

This application is a continuation of International Application No. PCT/CN2017/097118, filed on Aug. 11, 2017, which claims priority to Chinese Patent Application No. 201610664258.0, filed on Aug. 12, 2016, The disclosures of the aforementioned applications are hereby incorporated by reference in their entireties.

TECHNICAL FIELD

The present invention relates to the communications field, and in particular, to a control information transmission method and an apparatus.

BACKGROUND

Different types of reference signals are usually used in a communications system. One type of reference signal is used for channel estimation, so as to perform coherent demodulation on a received signal; and another type of reference signal is used to measure a channel state or channel quality, so as to schedule a terminal (user equipment (UE)). In a 3rd Generation Partnership Project (the 3rd generation partnership project, 3GPP for short) Long Term Evolution (long term evolution, LTE for short) release 10 (release 10, R10 for short) downlink system, a reference signal used for coherent demodulation is referred to as a demodulation reference signal (demodulation reference signal, DMRS for short), and a reference signal used for channel state information measurement is referred to as a channel state information-reference signal (channel state information reference signal, CSI-RS for short).

In the prior art, 10 transmission modes and seven corresponding transmission schemes used for signal transmission, and a plurality of downlink control information (downlink control information, DCI for short) formats are defined. Each transmission mode or each transmission scheme is corresponding to a specific DCI format of the transmission mode or the transmission scheme.

An air interface in a future 5G system needs to be redesigned. Therefore, a new control information transmission method is required.

SUMMARY

Embodiments of the present invention provide a control information transmission method and an apparatus.

According to a first aspect, an embodiment of the present invention provides a control information transmission method, including: sending control information, where the control information is associated with one of at least two transmission schemes, and the control information includes information used to indicate a transmission scheme type.

Optionally, control information corresponding to all the transmission schemes uses no more than three control information formats.

Optionally, a type of the transmission scheme associated with the control information is indicated based on an information field that is related to a quantity of spatial layers or a quantity of codewords in channel transmission and that is in a control information format used by the control information; or a type of the transmission scheme associated with the control information is indicated based on an information field that is used to carry transmission scheme indication information and that is in a control information format used by the control information.

Optionally, the control information format used by the control information includes a first format and/or a second format, the first format is used to indicate control information of common system information, and the second format is used to indicate control information of a user dedicated channel.

Optionally, the second format includes the information field that carries the transmission scheme indication information.

Optionally, the information field that carries the transmission scheme indication information is a 2-bit information field, and the 2-bit information field is used to carry the indication information of the transmission scheme type; or the information field that carries the transmission scheme indication information is a 1-bit information field, and the 1-bit information field is used to carry indication information of a mapping relationship between a codeword and a transmission scheme.

Optionally, the second format includes one or more of the following information fields:

an information field that carries indication information of the quantity of spatial layers in the channel transmission;

an information field that carries indication information of aperiodic reference signal rate matching; and an information field that carries transmit precoding matrix indicator information.

Optionally, second formats used by control information in different transmission schemes include different information fields, and/or in second formats used by control information in different transmission schemes, information bit quantities of information fields that are used to carry a same type of control information are different.

Optionally, the control information format used by the control information includes one or more of a fifth format, a third format, and a fourth format, the fifth format is used to indicate control information of common system information, and the third format and the fourth format are used to indicate control information of a user dedicated channel; and one part of control information of a first transmission scheme in the at least two transmission schemes uses the third format, and the other part of control information uses the fourth format.

Optionally, the third format is used by control information shared by all the transmission schemes, and the fourth format is used by control information specific to the first transmission scheme.

Optionally, the third format includes a first information field, and the first information field is used to carry indication information of the fourth format; and in the third format used by the control information of the first transmission scheme, the first information field carries first indication information, and the first indication information is used to indicate whether there is the fourth format.

Optionally, the first transmission scheme includes closed-loop transmission.

Optionally, the at least two transmission schemes include at least two of the following transmission schemes:

transmit diversity;
open-loop transmission;
semi-open-loop transmission; and
closed-loop transmission.

According to a second aspect, an embodiment of the present invention provides a control information receiving method, including: receiving control information, where the control information is associated with one of at least two transmission schemes, and the control information includes information used to indicate a transmission scheme type.

Optionally, control information corresponding to all the transmission schemes uses no more than three control information formats.

Optionally, a type of the transmission scheme associated with the control information is indicated based on an information field that is related to a quantity of spatial layers or a quantity of codewords in channel transmission and that is in a control information format used by the control information; or a type of the transmission scheme associated with the control information is indicated based on an information field that is used to carry transmission scheme indication information and that is in a control information format used by the control information.

Optionally, the control information format used by the control information includes a first format and/or a second format, the first format is used to indicate control information of common system information, and the second format is used to indicate control information of a user dedicated channel.

Optionally, the second format includes the information field that carries the transmission scheme indication information.

Optionally, the information field that carries the transmission scheme indication information is a 2-bit information field, and the 2-bit information field is used to carry an index value of the transmission scheme type; or the information field that carries the transmission scheme indication information is a 1-bit information field, and the 1-bit information field is used to carry indication information of a mapping relationship between a codeword and a transmission scheme.

Optionally, the second format includes one or more of the following information fields:

an information field that carries indication information of the quantity of spatial layers in the channel transmission;

an information field that carries indication information of aperiodic reference signal rate matching; and an information field that carries transmit precoding matrix indicator information.

Optionally, second formats used by control information in different transmission schemes include different information fields, and/or in second formats used by control information in different transmission schemes, information bit quantities of information fields that are used to carry a same type of control information are different.

Optionally, the control information format used by the control information includes one or more of a first format, a third format, and a fourth format, the first format is used to indicate control information of common system information, and the third format and the fourth format are used to indicate control information of a user dedicated channel; and one part of control information of a first transmission scheme in the at least two transmission schemes uses the third format, and the other part of control information uses the fourth format.

Optionally, the third format is used by control information shared by all the transmission schemes, and the fourth format is used by control information specific to the first transmission scheme.

Optionally, the third format includes a first information field, and the first information field is used to carry indication information of the fourth format; and in the third format used by the control information of the first transmission scheme, the first information field carries first indication information, and the first indication information is used to indicate that there is the fourth format.

Optionally, the first transmission scheme includes a closed-loop transmission mode.

Optionally, the at least two transmission schemes include at least two of the following transmission schemes:
transmit diversity;
open-loop transmission;
semi-open-loop transmission; and
closed-loop transmission.

According to a third aspect, an embodiment of the present invention provides a control information sending device, including: a sending module, configured to send control information, where the control information is associated with one of at least two transmission schemes, and the control information includes information used to indicate a transmission scheme type.

Optionally, control information corresponding to all the transmission schemes uses no more than three control information formats.

Optionally, a type of the transmission scheme associated with the control information is indicated based on an information field that is related to a quantity of spatial layers or a quantity of codewords in channel transmission and that is in a control information format used by the control information; or a type of the transmission scheme associated with the control information is indicated based on an information field that is used to carry transmission scheme indication information and that is in a control information format used by the control information.

Optionally, the control information format used by the control information includes a first format and/or a second format, the first format is used to indicate control information of common system information, and the second format is used to indicate control information of a user dedicated channel.

Optionally, the second format includes the information field that carries the transmission scheme indication information.

Optionally, the control information format used by the control information includes one or more of a first format, a third format, and a fourth format, the first format is used to indicate control information of common system information, and the third format and the fourth format are used to indicate control information of a user dedicated channel; and one part of control information of a first transmission scheme in the at least two transmission schemes uses the third format, and the other part of control information uses the fourth format.

Optionally, the third format is used by control information shared by all the transmission schemes, and the fourth format is used by control information specific to the first transmission scheme.

Optionally, the third format includes a first information field, and the first information field is used to carry indication information of the fourth format; and in the third format used by the control information of the first transmission scheme, the first information field carries first indication information, and the first indication information is used to indicate that there is the fourth format.

According to a fourth aspect, an embodiment of the present invention provides a control information receiving device, including: a receiving module, configured to receive control information, where the control information is associated with one of at least two transmission schemes, and the control information includes information used to indicate a transmission scheme type.

Optionally, control information corresponding to all the transmission schemes uses no more than three control information formats.

Optionally, a type of the transmission scheme associated with the control information is indicated based on an information field that is related to a quantity of spatial layers or a quantity of codewords in channel transmission and that is in a control information format used by the control information; or a type of the transmission scheme associated with the control information is indicated based on an information field that is used to carry transmission scheme indication information and that is in a control information format used by the control information.

Optionally, the control information format used by the control information includes a first format and/or a second format, the first format is used to indicate control information of common system information, and the second format is used to indicate control information of a user dedicated channel.

Optionally, the second format includes the information field that carries the transmission scheme indication information.

Optionally, the control information format used by the control information includes one or more of a first format, a third format, and a fourth format, the first format is used to indicate control information of common system information, and the third format and the fourth format are used to indicate control information of a user dedicated channel; and one part of control information of a first transmission scheme in the at least two transmission schemes uses the third format, and the other part of control information uses the fourth format.

Optionally, the third format is used by control information shared by all the transmission schemes, and the fourth format is used by control information specific to the first transmission scheme.

Optionally, the third format includes a first information field, and the first information field is used to carry indication information of the fourth format; and in the third format used by the control information of the first transmission scheme, the first information field carries first indication information, and the first indication information is used to indicate that there is the fourth format.

According to a fifth aspect, an embodiment of the present invention provides a wireless communications apparatus, including a transceiver, a processor, and a memory. The memory is configured to store a computer program instruction; and the processor is coupled to the memory and is configured to: read the computer program instruction stored in the memory, and perform the foregoing method.

According to a sixth aspect, another embodiment of the present invention provides a wireless communications apparatus, including a transceiver, a processor, and a memory. The memory is configured to store a computer program instruction; and the processor is coupled to the memory and is configured to: read the computer program instruction stored in the memory, and perform the foregoing method.

According to a seventh aspect, a computer readable storage medium is provided, and is configured to store a computer software instruction used to execute the foregoing first aspect or the second aspect, or functions in any design of the first aspect and the second aspect, and the computer readable storage medium includes a program designed for performing the foregoing first aspect or the second aspect, or methods in any design of the first aspect and the second aspect.

According to an eighth aspect, a computer program product that includes an instruction is provided. When the instruction is run on a computer, the computer performs the method according to the first aspect or the second aspect.

In the foregoing embodiments of the present invention, the control information sent by the control information sending device is associated with one of the at least two transmission schemes, and the control information includes the information used to indicate the transmission scheme type, so that the control information receiving device can determine the corresponding transmission scheme based on the received control information. Further, when a transmission scheme of the control information sending device needs to be switched, the corresponding control information may be sent, so that a transmission scheme of the receiving device is switched to the corresponding transmission scheme based on the control information, thereby implementing fast and dynamic switching between the at least two transmission schemes.

The embodiments of the present invention further provide a control information transmission method and an apparatus.

According to a ninth aspect, another embodiment of the present invention provides a control information sending method, including:

sending, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format.

Optionally, the control information is control information that is corresponding to data transmission on a user dedicated channel.

Optionally, a maximum bit quantity of the first-type control information format is less than a maximum bit quantity of the second-type control information format.

Optionally, the first-type control information format is used to indicate control information of a first transmission scheme, and the second-type control information format is used to indicate control information of a second transmission scheme.

Optionally, the first transmission scheme includes transmit diversity and/or open-loop transmission, or the second transmission scheme includes open-loop transmission and/or closed-loop transmission.

Optionally, T control information formats in the P first-type control information formats are the same as T control information formats in the Q second-type control information formats, T is an integer greater than or equal to 1, and T is less than or equal to P and less than or equal to Q.

Optionally, the first control channel includes a physical downlink control channel, and the second control channel includes an enhanced physical downlink control channel.

According to a tenth aspect, another embodiment of the present invention provides a control information receiving method, including: receiving, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format.

Optionally, the control information is control information that is corresponding to data transmission on a user dedicated channel.

Optionally, a maximum bit quantity of the first-type control information format is less than a maximum bit quantity of the second-type control information format.

Optionally, the first-type control information format is used to indicate control information of a first transmission scheme, and the second-type control information format is used to indicate control information of a second transmission scheme.

Optionally, the first transmission scheme includes transmit diversity and/or open-loop transmission, or the second transmission scheme includes open-loop transmission and/or closed-loop transmission.

Optionally, T control information formats in the P first-type control information formats are the same as T control information formats in the Q second-type control information formats, T is an integer greater than or equal to 1, and T is less than or equal to P and less than or equal to Q.

Optionally, the first control channel includes a physical downlink control channel, and the second control channel includes an enhanced physical downlink control channel.

According to an eleventh aspect, another embodiment of the present invention provides a control information sending device, including: a sending module, configured to send, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format.

Optionally, the control information is control information that is corresponding to data transmission on a user dedicated channel.

Optionally, the first-type control information format is used to indicate control information of a first transmission scheme, and the second-type control information format is used to indicate control information of a second transmission scheme.

According to a twelfth aspect, another embodiment of the present invention provides a control information receiving device, including: a receiving module, configured to receive, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format.

Optionally, the control information is control information that is corresponding to data transmission on a user dedicated channel.

Optionally, the first-type control information format is used to indicate control information of a first transmission scheme, and the second-type control information format is used to indicate control information of a second transmission scheme.

According to a thirteenth aspect, another embodiment of the present invention provides a wireless communications apparatus, including a transceiver, a processor, and a memory, where the memory is configured to store a computer program instruction; and the processor is coupled to the memory and is configured to: read the computer program instruction stored in the memory, and perform the foregoing method.

According to a fourteenth aspect, another embodiment of the present invention provides a wireless communications apparatus, including a transceiver, a processor, and a memory, where the memory is configured to store a computer program instruction; and the processor is coupled to the memory and is configured to: read the computer program instruction stored in the memory, and perform the foregoing method.

According to a fifteenth aspect, a computer readable storage medium is provided, and is configured to store a computer software instruction used to execute the foregoing ninth aspect or the tenth aspect, or functions in any design of the ninth aspect and the tenth aspect, and the computer readable storage medium includes a program designed for performing the foregoing ninth aspect or the tenth aspect, or methods in any design of the ninth aspect and the tenth aspect.

According to a sixteenth aspect, a computer program product that includes an instruction is provided. When the instruction is run on a computer, the computer performs the method according to the ninth aspect or the tenth aspect.

In the foregoing embodiment of the present invention, the control information sending device sends, based on the type of the control channel used to send the control information, the control information by using the control information format corresponding to the type of the control channel, where the first control channel is corresponding to the P first-type control information formats, the second control channel is corresponding to the Q second-type control information formats, and the two types of control information formats differ in at least one of a quantity of control information formats, a maximum bit quantity of a control information format, and a minimum bit quantity of a control information format. In this way, the control information can be sent on different types of control channels by using different types of control information formats. Because the two types of control information formats differ in at least one of the quantity of control information formats, the maximum bit quantity of a control information format, and the minimum bit quantity of a control information format, the control information is sent based on a type of a control channel by using a control information format that adapts to the type. Therefore, in some embodiments, performance of control information transmission can be improved when the present invention is used.

BRIEF DESCRIPTION OF DRAWINGS

FIG. 1 is a schematic diagram of a network architecture to which an embodiment of the present invention is applicable;

FIG. 2 is a schematic diagram of a control information transmission procedure in Solution 1 according to an embodiment of the present invention;

DESCRIPTION OF EMBODIMENTS

Figure 3:
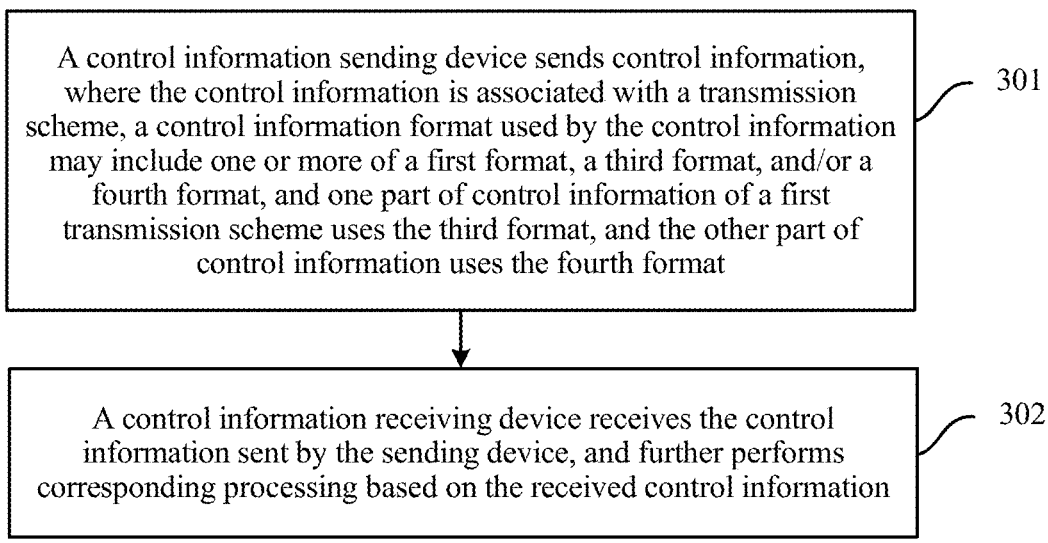
FIG. 3 is a schematic diagram of a control information transmission procedure in Solution 2 according to an embodiment of the present invention.

As described in the background, 10 transmission modes, seven corresponding transmission schemes, and a plurality of DCI formats are defined in the prior art. A feedback mode and a transmission mode of a terminal are bound, and there are different feedback modes in different transmission modes. Therefore, excessive transmission modes or transmission schemes and corresponding DCI formats lead to frequent Radio Resource Control (radio resource control, RRC for short) reconfiguration of the terminal between different transmission modes, and consequently blind detection complexity of the terminal is increased.

An air interface in a future 5G system needs to be redesigned, including a transmission mode or a transmission scheme for data transmission, a DCI format corresponding to the transmission mode or the transmission scheme, and the like. Therefore, a new simplified transmission scheme and a corresponding control information format need to be defined.

Based on this, embodiments of the present invention provide a control information transmission method and a related device. The embodiments of the present invention are applicable to control information transmission corresponding to downlink data transmission, and are also applicable to control information transmission corresponding to uplink data transmission. Control information used in the embodiments of the present invention may be downlink control information corresponding to the downlink data transmission, or may be downlink control information corresponding to the uplink data transmission. Further, the control information may be downlink control information, or may be uplink control information.

In the embodiments of the present invention, for control information transmission, related devices include a control information sending device and a control information receiving device. The sending device may configure the receiving device to perform channel measurement and feedback, and the sending device may determine a used transmission scheme based on the feedback of the receiving device, and send control information related to the transmission scheme to the receiving device. In downlink control information transmission corresponding to downlink or uplink data transmission, the sending device may be a base station or another type of transmission point device, and the receiving device may be a terminal or another device that can implement a similar function. In uplink control information transmission, the sending device may be a terminal or another device that can implement a similar function, and the receiving device may be a base station or another type of transmission point device. Certainly, the devices are not limited to the foregoing two devices.

The base station may be an evolved NodeB (evolved NodeB, eNB or eNodeB for short), a macro base station, a micro base station (also referred to as a "small cell"), a pico base station, an access point (access point, AP for short), a transmission point (transmission point, TP for short), or the like in an LTE system or in an evolved LTE system, or may be a base station in a future network, for example, a base station in a 5G network.

In the embodiments of the present invention, a terminal may also be referred to as user equipment (for example, UE), or may be referred to as a terminal, a mobile station (mobile station, MS for short), a mobile terminal (mobile terminal), or the like. The terminal may communicate with one or more core networks by using a radio access network (radio access network, RAN for short). For example, the terminal may be a mobile phone (or referred to as a "cellular" phone) or a computer with a mobile terminal. For example, the terminal may alternatively be a portable, pocket-sized, handheld, computer built-in, or in-vehicle mobile apparatus, which exchanges voice and/or data with the radio access network. The terminal in the embodiments of the present invention may alternatively be a device-to-device (device to device, D2D for short) terminal or a machine-to-machine (machine to machine, M2M for short) terminal.

For ease of description, in descriptions in the following embodiments, for example, the base station is used as the downlink control information sending device, and the terminal is used as the downlink control information receiving device.

The embodiments of the present invention are applicable to a wireless communications network, for example, an LTE system or an evolved LTE system, and a wideband code division multiple access (wideband code division multiple access, WCDMA for short) system. Details are not listed one by one herein. FIG. 1 shows an example architecture related to an embodiment of the present invention in the wireless communications network. Uplink (in other words, a terminal to a base station) transmission and downlink (in other words, the base station to the terminal) transmission may be performed between the base station and the terminal.

The following several transmission schemes are defined in the embodiments of the present invention, and these transmission schemes are applicable to a 5G system.

(1). Transmit diversity: including DMRS-based transmit diversity and/or transmit diversity based on a cell-level reference signal. The DMRS-based transmit diversity means that a transmit mode of data transmission is a diversity scheme in which a DMRS is used as a demodulation reference signal. The transmit diversity based on a cell-level reference signal means that a transmit mode of data transmission is a diversity scheme in which a cell-level reference signal is used as a demodulation reference signal.

(2). Open-loop transmission: including DMRS-based open-loop transmission and/or open-loop transmission based on a cell-level reference signal. The DMRS-based open-loop transmission means that a transmit mode of data transmission is an open-loop scheme in which a DMRS is used as a demodulation reference signal. The open-loop transmission based on a cell-level reference signal means that a transmit mode of data transmission is an open-loop scheme in which a cell-level reference signal is used as a demodulation reference signal.

(3). Semi-open-loop transmission: including DMRS-based semi-open-loop transmission and/or semi-open-loop transmission based on a cell-level reference signal. The DMRS-based semi-open-loop transmission means that a transmit mode of data transmission is a semi-open-loop scheme in which a DMRS is used as a demodulation reference signal. The semi-open-loop transmission based on a cell-level reference signal means that a transmit mode of data transmission is a semi-open-loop scheme in which a cell-level reference signal is used as a demodulation reference signal. Optionally, the semi-open-loop transmission may be a transmission scheme between open-loop transmission and closed-loop transmission.

(4). Closed-loop transmission: including DMRS-based closed-loop transmission and/or closed-loop transmission based on a cell-level reference signal. The DMRS-based closed-loop transmission means that a transmit mode of data transmission is a closed-loop scheme in which a DMRS is used as a demodulation reference signal. The closed-loop transmission based on a cell-level reference signal means that a transmit mode of data transmission is a closed-loop scheme in which a cell-level reference signal is used as a demodulation reference signal.

Certainly, naming of the foregoing transmission schemes is merely an example, and another naming manner is not excluded in the embodiments of the present invention. The transmission scheme is a transmission scheme in a broad sense. A definition of the transmission scheme in a broad sense is applicable to both downlink data transmission and uplink data transmission.

It should be noted that the several transmission schemes are merely listed above for example. In the embodiments of the present invention, another type of transmission scheme or more types of transmission schemes are allowed to be defined. For example, the transmit diversity may further include transmit diversity of a beam domain, and the transmit diversity of the beam domain means that to-be-transmitted information with same content is sent by using at least two beams.

The foregoing four transmission schemes are used as examples to describe the following embodiments.

Three control information transmission solutions (Solution 1, Solution 2, and Solution 3) are provided in the embodiments of the present invention. The three solutions are separately described below.

In Solution 1 and Solution 2, control information sent by a control information sending device is associated with one of the foregoing transmission schemes, and the transmission scheme associated with the control information may be specifically indicated by using information that is used to indicate a transmission scheme type and that is included in the sent control information.

The transmission scheme associated with the control information may be indicated implicitly; to be specific, a type of the transmission scheme associated with the control information may be indicated by using one or more pieces of control information included in the control information. In some embodiments, the transmission scheme type is related to a quantity of spatial layers or a quantity of codewords in channel transmission. Therefore, the type of the transmission scheme associated with the control information may be indicated based on an information field that is related to the quantity of spatial layers or the quantity of codewords in the channel transmission and that is in a control information format used by the control information. For example, in downlink control information transmission corresponding to downlink data transmission, if the quantity of spatial layers in the channel transmission is 1 (in other words, a quantity of channel transmission layers from the base station to the terminal is equal to 1) in a DCI format used by downlink control information, a transmission scheme associated with the downlink control information is the transmit diversity. If the quantity of spatial layers in the channel transmission is 2 (in other words, a quantity of channel transmission layers from the base station to the terminal is equal to 2) in a DCI format used by downlink control information, a transmission scheme associated with the downlink control information is the open-loop transmission. If the quantity of spatial layers in the channel transmission is greater than 4 (in other words, a quantity of channel transmission layers from the base station to the terminal is greater than 4) in a DCI format used by downlink control information, a transmission scheme associated with the downlink control information is the closed-loop transmission. It should be noted that the method is also applicable to downlink control information transmission corresponding to uplink data transmission, and details are not repeated herein.

Alternatively, the transmission scheme associated with the control information may be indicated explicitly. In the embodiments of the present invention, the control information format may be extended, and an information field is defined in the control information format to carry transmission scheme indication information, so as to indicate the transmission scheme type.

Regardless of whether the type of the transmission scheme associated with the control information is indicated implicitly or explicitly, for a control information receiving device, the type of the transmission scheme associated with the control information may be determined based on the received control information, so that transmission may be performed by using the transmission scheme of the corresponding type. When determining to change a transmission scheme of a receiving device from a first transmission scheme to a second transmission scheme (the first transmission scheme and the second transmission scheme may be two different transmission schemes in the foregoing transmission schemes), a control information sending device may send control information associated with the second transmission scheme to the receiving device. The receiving device performs corresponding setting based on the received control information, and communicates with the sending device by using the second transmission scheme, to implement fast and dynamic switching between different transmission schemes.

Solution 1, Solution 2, and Solution 3 are separately described in detail below.

Solution 1

In an embodiment of Solution 1 of the present invention, design of a control information format is simplified, so that control information corresponding to all the foregoing transmission schemes uses no more than two control information formats. Specifically, two control information formats are provided in Solution 1: a first control information format and a second control information format. A manner of naming the first control information format and the second control information format is not limited in this embodiment of the present invention.

A specific implementation of Solution 1 is described below by using downlink control information transmission corresponding to downlink data transmission as an example.

A first DCI format and a second DCI format are defined in this embodiment of the present invention. The first DCI format is mainly used to indicate control information of common system information, in other words, control information that is transmitted by using the first DCI format mainly includes control indication information corresponding to the common system information, for example, a control indication used for sending on a broadcast channel. For example, the first DCI format may carry one or more of the following control information: control indication information of paging information, control indication information of a random access response, control indication information of a dynamic broadcast channel, control indication information of system information, and the like.

Optionally, the first DCI format may include the following information fields:

a measurement gap indication field, used to indicate a measurement gap (measurement GAP) value, where an information bit quantity of this information field may be one bit;

a resource allocation indication field, used to indicate resource block assignment for compact scheduling (resource block assignment for compact scheduling), where an information bit quantity of this information field may be x bits, and x is an integer greater than or equal to 1;

a modulation and coding scheme (modulation and coding scheme, MCS for short) indication field, used to indicate an MCS value, where an information bit quantity of this information field may be 5 bits;

a multicast control channel (multicast control channel, MCCH for short) notification information indication field, used to carry information for MCCH change notification (information for MCCH change notification) or indication information of information for MCCH change notification, where a bit quantity of this information field may be 8 bits; and a reserved information field or a reserved information bit field, where when an information bit quantity of downlink control information does not reach a size of a compact scheduling format 1C of one physical downlink shared channel (physical downlink shared channel, PDSCH for short) codeword, the reserved information field may be used for padding, so that the information bit quantity of the downlink control information is equal to the size of the compact scheduling format 1C of one PDSCH codeword. In addition, the first DCI format may further include some new indication fields that are used to indicate control information of common system information in a 5G system. This is not limited herein.

Control information transmitted by using the second DCI format mainly includes a control information indication of a user dedicated channel, in other words, the control information transmitted by using the second DCI format mainly includes user dedicated control information, for example, a control indication used for sending on a user dedicated channel. For example, the second DCI format may carry one or more of the following control information: an indication of a quantity of spatial layers in channel transmission, an indication of a codeword-to-layer mapping, scheduling information related to resource allocation, and the like.

Optionally, the second DCI format may include the following information field:

a transmission scheme indication field, used to carry transmission scheme indication information (transmission scheme indicator), for example, indication information that carriers a transmission scheme type. Optionally, an information bit quantity of this information field may be one bit or two bits, and is used to indicate dynamic switching of a transmission scheme.

If the information bit quantity of the transmission scheme indication field is equal to 2, the 2-bit transmission scheme indication field is used to carry indication information (for example, an index value) of the transmission scheme type. Table 1 shows an example of each status value of this indication field (that is, the index value of the transmission scheme type).

TABLE 1

Status value of the 2-bit transmission scheme indication field

| Status value (a decimal number that is obtained after mapping of a 2-bit sequence) | Transmission scheme type |
| --- | --- |
| 0 | Transmit diversity based on a cell-level reference signal |
| 1 | DMRS-based transmit diversity |
| 2 | DMRS-based open-loop transmission or open-loop transmission based on a cell-level reference signal |
| 3 | DMRS-based closed-loop transmission |

Optionally, Table 2 shows an example of another implementation of each status value of this indication field (that is, the index value of the transmission scheme type).

TABLE 2

Status value of the 2-bit transmission scheme indication field

| Status Value (a decimal number that is obtained after mapping of a 2-bit sequence) | Transmission scheme type |
| --- | --- |
| 0 | DMRS-based transmit diversity |
| 1 | DMRS-based open-loop transmission or open-loop transmission based on a cell-level reference signal |
| 2 | DMRS-based semi-open-loop transmission or semi-open-loop transmission based on a cell-level reference signal |
| 3 | DMRS-based closed-loop transmission |

On a terminal side, a terminal may receive downlink control information sent by a base station according to the foregoing method, and determine, based on the status value of the received 2-bit transmission scheme indication field in the second DCI format, a transmission scheme associated with the downlink control information.

If the information bit quantity of the transmission scheme indication field is equal to 1, the 1-bit information field is used to carry indication information of a mapping relationship between a codeword and a transmission scheme, and the indication information may indicate a transmission scheme type corresponding to each codeword.

Optionally, the 1-bit transmission scheme indication field may be implemented by reusing the following information field in a current LTE system: a transport block to codeword swap flag (transport block to codeword swap flag), and this information field is a 1-bit information field. Each status value of this indication field (that is, a value of the transmission scheme indication information) may be shown in Table 3.

TABLE 3

| Status value of the 1-bit transmission scheme indication field | | |
| --- | --- | --- |
| Status Value | Codeword 0 | Codeword 1 |
| 0 | Transmit diversity | Open-loop transmission |
| 1 | Closed-loop transmission | Closed-loop transmission |

Optionally, Table 4 shows an example of another implementation of each status value of this indication field (that is, the index value of the transmission scheme type).

TABLE 4

| Status value of the 1-bit transmission scheme indication field | | |
| --- | --- | --- |
| Status Value | Codeword 0 | Codeword 1 |
| 0 | Open-loop transmission | Open-loop transmission |
| 1 | Closed-loop transmission | Closed-loop transmission |

According to Table 3, when the status value of the transmission scheme indication field is equal to 0, the transmit diversity or the open-loop transmission scheme is used for the codeword 0, and the open-loop transmission is used for the codeword 1; and when the status value of the transmission scheme indication field is equal to 1, the closed-loop transmission is used for the codeword 0, and the closed-loop transmission is used for the codeword 1. On a terminal side, a terminal may receive downlink control information sent by a base station according to the foregoing method, and determine, based on the status value of the received 1-bit transmission scheme indication field in the second DCI format, a transmission scheme used in each codeword.

Optionally, the second DCI format may include one or more of the following information fields:

A layer indication field is used to carry indication information of the quantity of spatial layers in channel transmission, a bit quantity of this information field may be x bits, and x is an integer greater than 0.

The layer indication field is optional, depending on the transmission scheme type. For example, the information bit quantity of the layer indication field is x (x>0) in the closed-loop transmission scheme, but the information bit quantity is 0 in the open-loop transmission scheme or the transmit diversity. In other words, there is a layer indication information field in the closed-loop transmission scheme, but there is no layer indication information field in the open-loop transmission scheme or the transmit diversity. Therefore, whether the transmission scheme associated with the downlink control information sent by using the second DCI format is the closed-loop transmission scheme may be learned based on whether there is the layer indication field in the second DCI format.

An aperiodic reference signal rate matching indication field is used to carry indication information of aperiodic reference signal rate matching, a bit quantity of this information field may be y bits, and y is an integer greater than 0. The aperiodic reference signal may be a CSI-RS.

An aperiodic CSI-RS rate matching indication field is optional, depending on the transmission scheme type. For example, an information bit quantity of the aperiodic CSI-RS rate matching indication field is y (y>0) in the closed-loop transmission scheme, but an information bit quantity is 0 in the open-loop transmission scheme or the transmit diversity. In other words, there is the aperiodic CSI-RS rate matching indication field in the closed-loop transmission scheme, but there is no aperiodic CSI-RS rate matching indication field in the open-loop transmission scheme or the transmit diversity. Therefore, whether the transmission scheme associated with the downlink control information sent by using the second DCI format is the closed-loop transmission scheme may be learned based on whether there is the aperiodic CSI-RS rate matching indication field in the second DCI format.

A transmit precoding matrix indicator (transmit precoding matrix indicator, TPMI for short) indication field is used to carry a TPMI, a bit quantity of this information field may be z bits, and z is an integer greater than 0.

The TPMI indication field is optional, depending on the transmission scheme type. An information bit quantity of the TPMI indication field is z (z>0) in a non-DMRS-based transmission scheme (such as closed-loop transmission based on a cell-level reference signal or the open-loop transmission based on a cell-level reference signal), but an information bit quantity is 0 in the DMRS-based closed-loop transmission scheme. In other words, there is no TPMI indication field in the DMRS-based closed-loop transmission scheme, but there is the TPMI indication field in the non-DMRS-based transmission scheme. Therefore, whether the transmission scheme associated with the downlink control information sent by using the second DCI format is the DMRS-based closed-loop transmission scheme may be learned based on whether there is the TPMI indication field in the second DCI format.

It may be learned from the foregoing descriptions that second DCI formats used by downlink control information in different transmission schemes may include different information fields. Further, in the second DCI formats used by the downlink control information of the different transmission schemes, information bit quantities of information fields that are used to carry a same type of downlink control information may be different. During specific implementation, to ensure that the information bit quantities of the second DCI formats in the different transmission schemes are the same, the bit quantities of the second DCI formats in the different transmission schemes may be the same by adding zeros.

Although the foregoing embodiment is described by using control information corresponding to downlink data or signal transmission as an example, an implementation principle of the foregoing embodiment is also applicable to control information corresponding to uplink data or signal transmission. In the control information and a control information format that are corresponding to the uplink data or signal transmission, content that can be carried in and an information field that can be included in the second control information format used for a user dedicated channel may be the same as those in the foregoing descriptions, except that control indication information used for common system information is not supported. Details are not described herein. Likewise, the second control information format is mainly used for control indication information of a user uplink dedicated channel (for example, a physical uplink shared channel (physical uplink shared channel, PUSCH)).

FIG. 2 is a schematic diagram of a control information (for example, downlink control information corresponding to downlink data transmission or downlink control information corresponding to uplink data transmission) transmission procedure suitable to Solution 1 according to an embodiment of the present invention. The procedure may include the following steps.

Step 201: A control information sending device sends control information, where the control information is associated with one of the foregoing transmission schemes, and includes information used to indicate a transmission scheme type. A control information format used by the control information may include a first format and/or a second format, the first format is used to indicate control information of common system information, and the second format is used to indicate control information of a user dedicated channel. In this step, for a manner of sending the control information by the control information sending device, refer to the foregoing descriptions.

Step 202: A control information receiving device receives the control information sent by the sending device, and further performs corresponding processing based on the received control information.

In this step, the receiving device may determine, based on an information field included in the second format, a type of the transmission scheme corresponding to the control information, and performs data transmission by using the transmission scheme.

On a receiving device side, the receiving device may receive the control information sent by the sending device according to the foregoing method, and determine, based on a received related information field in the second format, the transmission scheme associated with the control information. For example, a terminal may determine, based on a status value of a transmission scheme indication field in the second format, the transmission scheme associated with the control information, or the terminal may determine, based on a status value of a layer indication field in the second format, the transmission scheme associated with the control information, or the terminal may determine, with reference to status values of a plurality of information fields, the transmission scheme associated with the control information. For example, the receiving device determines, based on the status value of the transmission scheme indication field in the second format, that the transmission scheme is closed-loop transmission. Because the second format further includes a TPMI indication field, it is determined that the transmission scheme associated with the control information carried in the second format is a closed-loop transmission scheme based on a cell-level reference signal.

It may be learned from the foregoing descriptions of Solution 1 that the control information sent by the control information sending device is associated with one of at least two transmission schemes, and the control information includes information used to indicate the transmission scheme type, so that the control information receiving device can determine the corresponding transmission scheme based on the received control information. Further, when a transmission scheme of the control information sending device needs to be switched, the corresponding control information may be sent, so that a transmission scheme of the receiving device is switched to the corresponding transmission scheme based on the control information. For example, when a channel is in a relatively good condition, a base station sends downlink control information by using a second DCI format, and a status value of a transmission scheme indication field is equal to 3, so as to instruct the terminal to perform data transmission in a closed-loop manner. When the channel condition deteriorates, the base station sends the downlink control information by using the second DCI format, and the status value of the transmission scheme indication field is equal to 2, so as to instruct the terminal to perform data transmission in an open-loop manner.

Solution 2

In an embodiment provided in Solution 2, design of a control information format is simplified, so that control information corresponding to all the foregoing transmission schemes uses no more than three control information formats. The control information formats may specifically include a third control information format, a fourth control information format, and a fifth control information format. A manner of naming the foregoing control information formats is not limited in this embodiment of the present invention.

A specific implementation of Solution 2 is described below by using downlink control information transmission corresponding to downlink data transmission as an example.

The downlink control information transmission corresponding to the downlink data transmission is used as an example. A third DCI format, a fourth DCI format, and a fifth DCI format are defined in this embodiment of the present invention. It may be stipulated that one part of downlink control information of a first transmission scheme in the foregoing four transmission schemes uses the third DCI format, and the other part of downlink control information uses the fourth DCI format. In this embodiment, considering that closed-loop transmission is used as an important transmission scheme in a future 5G communications system, for a newly-added feature of the transmission scheme, a newly-added information bit corresponding to the transmission scheme may be sent by using the fourth DCI format; in other words, a new information field introduced during 5G system evolution may be included in the fourth DCI format. Therefore, a size of the fourth DCI format may be designed based on evolution of a closed-loop transmission scheme. Optionally, the fourth DCI format in Solution 2 may be designed with reference to the second DCI format in Solution 1. For another transmission scheme other than the closed-loop transmission, downlink control information uses the third DCI format.

For example, the first transmission scheme is the closed-loop transmission. The fifth DCI format is mainly used to indicate control information of common system information, the third DCI format is mainly used to transmit control indication information of a user dedicated channel shared by the foregoing four transmission schemes, and the fourth DCI format is used to transmit control indication information of a user dedicated channel specific to the closed-loop transmission scheme.

Optionally, the third DCI format may include at least one of the following information fields:

a carrier indication field;

a resource allocation type indication field (an indication of a resource allocation type);

a resource block assignment indication field;

a power control command indication field;

a hybrid automatic repeat request (hybrid Automatic retransmission repeat request, HARQ for short) process number indication field;

a HARQ offset indication field;

a modulation and coding scheme indication field;

a new data transmission indication field;

a redundancy version indication field;

a precoding information indication field; and a transport block to codeword mapping swap indication field.

One or some information fields in the third DCI format may implicitly indicate whether there is the fourth DCI format. For example, when a value of the transport block to codeword mapping swap indication field is 0, it indicates that swap mapping between at least two code blocks is not performed on a transport block; and when the value of the indication field is 1, it indicates that swap mapping between at least two code blocks is performed on the transport block. When the value of the indication field is 0, it implicitly indicates that there is no fourth DCI format, and when the value of the indication field is 1, it implicitly indicates that there is the fourth DCI format.

Optionally, the third DCI format may include a first information field, the first information field is used to carry indication information of the fourth DCI format, and the indication information may explicitly indicate whether there is the fourth DCI format. Optionally, the information field that is in the third DCI format and that is used to indicate the fourth DCI format may be shown as follows:

A second-level DCI format indication field is used to carry an indication of the fourth DCI format, and a bit quantity of this information field may be 1 or 2.

When a value of the indication information in the first information field in the third DCI format indicates that there is the fourth DCI format, it indicates that a sending device (for example, a base station) further sends downlink control information in the closed-loop transmission scheme by using the fourth DCI format, and a receiving device (for example, a terminal) may determine, based on the value of the first information field, whether the downlink control information sent by the sending device (for example, the base station) is the downlink control information in the closed-loop transmission scheme, and further determine whether to detect and receive the downlink control information that is sent by using the fourth DCI format.

For example, an information bit quantity of the first information field may be 1 bit, and when a status value of the 1-bit information field is equal to 1, it indicates that the downlink control information sent by the base station is the downlink control information in the closed-loop transmission scheme, in other words, there is the fourth DCI format. If there is no information field in the third DCI format, or if there is the information field but the status value of the information field is equal to 0, it indicates that the downlink control information sent by the base station is not the downlink control information in the closed-loop transmission scheme, in other words, there is no fourth DCI format.

Optionally, the fourth DCI format includes the following information fields.

A sounding reference signal (sounding reference signal, SRS for short) request indication field is used to carry SRS request (SRS request) indication information, and this information field may be a 0-bit or 1-bit information field.

A layer indication field is used to carry indication information of a quantity of spatial layers in channel transmission, and a bit quantity of this information field may be 3 bits.

A PDSCH resource element (resource element, RE for short) mapping and quasi-co-location indication field is used to carry a PDSCH RE mapping and quasi-co-location indicator (PDSCH RE mapping and quasi-co-location indicator), and this information field may be a 2-bit information field.

An aperiodic reference signal rate matching indication field is used to carry indication information of aperiodic reference signal rate matching, a bit quantity of this information field may be x bits, and x is an integer greater than 0. The aperiodic reference signal may be a CSI-RS.

An information field that is reserved for a next radio system (next radio, NR for short) newly-added information bit is used to carry another possible NR newly-added information bit, a bit quantity of this information field may be y bits, and y is an integer greater than or equal to 0. For example, some new control information related to a beam is newly introduced in a 5G system.

Although the foregoing embodiment is described by using control information corresponding to downlink data or signal transmission as an example, an implementation principle of the foregoing embodiment is also applicable to control information corresponding to uplink data or signal transmission. In the control information and a control information format that are corresponding to the uplink data or signal transmission, content that can be carried in and an information field that can be included in a third format and a fourth format that are used for a user dedicated channel may be the same as those in the foregoing descriptions, except control indication information used for common system information. Details are not described herein. Likewise, the third format is mainly used to transmit control indication information of a user dedicated channel shared by the foregoing four transmission schemes, and the fourth format is used to transmit control indication information of a user dedicated channel specific to the closed-loop transmission scheme.

FIG. 3 is a schematic diagram of a control information transmission procedure suitable to Solution 2 according to an embodiment of the present invention. The procedure may include the following steps.

Step 301: A control information sending device sends control information, where the control information is associated with one of the foregoing transmission schemes, a control information format used by the control information may include one or more of a third control information format, a fourth control information format, and a fifth control information format, and one part of control information of a first transmission scheme in the foregoing transmission schemes uses the third control information format, and the other part of control information uses the fourth control information format. In this step, for a manner of sending the control information by the sending device, refer to the foregoing descriptions.

Step 302: A control information receiving device receives the control information sent by the sending device, and further performs corresponding processing based on the received control information.

In this step, the receiving device may determine, based on an information field in the third control information format, a type of the transmission scheme corresponding to the control information, and performs data transmission by using the transmission scheme.

On a receiving device side, the receiving device may receive the control information sent by the sending device according to the foregoing method, and determine, based on a received related information field in the third control information format, the transmission scheme associated with the control information. For example, in downlink control information transmission, a terminal may determine, based on a status value of a first information field in a third DCI format, a type of a transmission scheme associated with downlink control information, or the terminal may determine, based on a status value of another information field in the third DCI format, a type of a transmission scheme associated with downlink control information.

In a scenario of downlink control information transmission corresponding to downlink data transmission, at a moment t1, if a base station determines to use a transmission scheme of transmit diversity, the base station sends downlink control information of the transmission scheme to the terminal by using the third DCI format (the value of the first information field in the third DCI format is 0, and it indicates that there is no fourth DCI format); and at a moment t2, if the base station determines to use closed-loop transmission, the base station sends downlink control information of this transmission scheme to the terminal by using the third DCI format and a fourth DCI format (the status value of the first information field in the third DCI format is equal to 1, and it indicates that there is the fourth DCI format). On a terminal side, if indication information in the received first information field included in the third DCI format indicates that there is no fourth DCI format, blind detection is not further performed on the fourth DCI format; otherwise, blind detection needs to be performed on the fourth DCI format, to obtain the downlink control information of the closed-loop transmission.

It may be learned from the foregoing descriptions in the embodiment of Solution 2 that the control information sent by the control information sending device is associated with one of at least two transmission schemes, and the control information includes information used to indicate a transmission scheme type, so that the control information receiving device can determine the corresponding transmission scheme based on the received control information. Further, when a transmission scheme of the control information sending device needs to be switched, the corresponding control information may be sent, so that a transmission scheme of the receiving device is switched to the corresponding transmission scheme based on the control information.

Solution 3

In solution 3 of the present invention, control information is sent on different types of control channels by using different types of control information formats. A first control channel is corresponding to P first-type control information formats, a second control channel is corresponding to Q second-type control information formats, and both P and Q are integers greater than or equal to 1.

The two types of control information formats differ in at least one of the following aspects.

Quantities of control information formats corresponding to the two types of control information formats are different, in other words, values of P and Q are different.

Maximum bit quantities corresponding to the two types of control information formats are different. A maximum bit quantity of the first-type control information format is a size of a control information format with a maximum bit quantity in the first-type control information format, and a maximum bit quantity of the second-type control information format is a size of a control information format with a maximum bit quantity in the second-type control information format. Optionally, the maximum bit quantity of the first-type control information format is less than the maximum bit quantity of the second-type control information format.

Minimum bit quantities corresponding to the two types of control information formats are different. A minimum bit quantity of the first-type control information format is a size of a control information format with a minimum bit quantity in the first-type control information format, and a minimum bit quantity of the second-type control information format is a size of a control information format with a minimum bit quantity in the second-type control information format. Optionally, the minimum bit quantity of the first-type control information format is less than the minimum bit quantity of the second-type control information format.

Optionally, in downlink control information transmission, the first control channel may include a physical downlink control channel (physical downlink control channel, PDCCH for short), and the second control channel may include an enhanced physical downlink control channel (enhanced-physical downlink control channel, e-PDCCH for short). A first-type DCI format corresponding to the first control channel is mainly a control information indication format with a relatively small information bit quantity, for example, a DCI format 1C and a DCI format 2A. A second-type DCI format corresponding to the second control channel is mainly a control information indication format with a relatively large information bit quantity, for example, a DCI format 2 and a DCI format 2D.

Optionally, control information that is sent by using the first-type control information format or the second-type control information format is control information corresponding to data transmission on a user dedicated channel. In downlink control information transmission corresponding to downlink data transmission, the user dedicated channel may be a PDSCH or a PUSCH, or may be another user dedicated channel. This is not limited herein.

Optionally, the first-type control information format is used to indicate control information of a first transmission scheme, and the second-type control information format is used to indicate control information of a second transmission scheme. For example, transmission schemes include transmit diversity, open-loop transmission, and closed-loop transmission. The first transmission scheme herein includes the transmit diversity and/or the open-loop transmission, or the second transmission scheme includes the open-loop transmission and/or the closed-loop transmission. For example, a combination of the first transmission scheme and the second transmission scheme may include one of the following.

The first transmission scheme is the transmit diversity, and the second transmission scheme may include the open-loop transmission or the closed-loop transmission or both.

The first transmission scheme is the open-loop transmission, and the second transmission scheme may include the transmit diversity or the closed-loop transmission or both.

The second transmission scheme is the open-loop transmission, and the first transmission scheme may include the transmit diversity or the closed-loop transmission or both.

The second transmission scheme is the closed-loop transmission, and the first transmission scheme may include the transmit diversity or the open-loop transmission or both.

The transmission scheme is a data transmission scheme of a user dedicated channel such as a PDSCH or a PUSCH, or may be a transmission scheme used in data transmission of another channel or signal (for example, an enhanced downlink control channel). This is not limited herein.

Optionally, the P first-type control information formats corresponding to the first control channel may be partially the same as the Q second-type control information formats corresponding to the second control channel. For example, T control information formats in the P first-type control information formats are the same as T control information formats in the Q second-type control information formats, T is an integer greater than or equal to 1, and T is less than or equal to P and less than or equal to Q.

Figure 4:
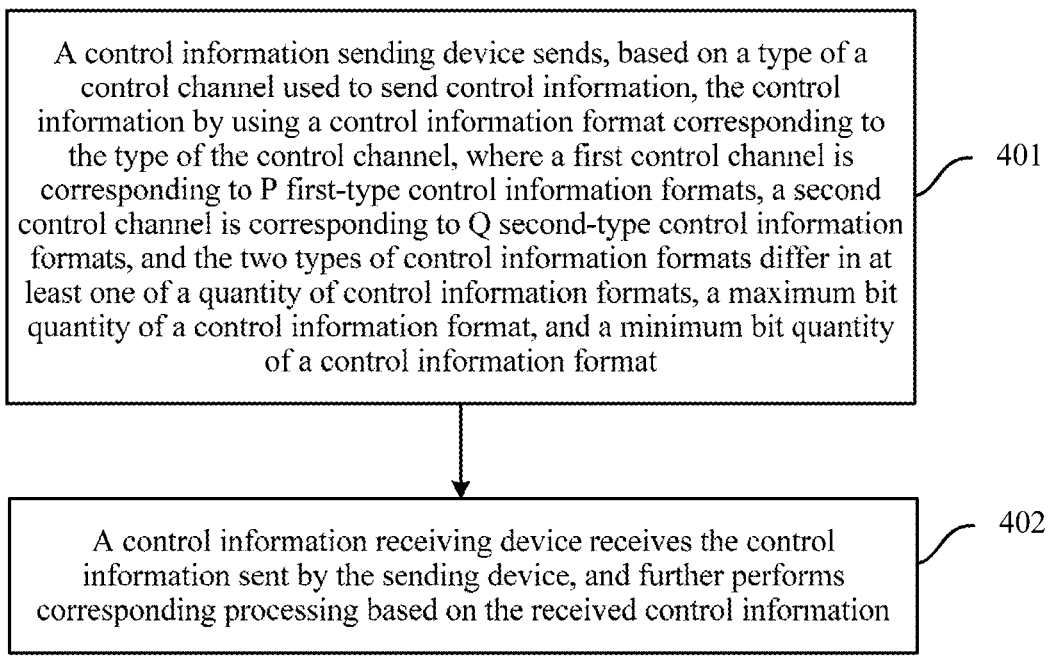
FIG. 4 is a schematic diagram of a control information transmission procedure in Solution 3 according to an embodiment of the present invention.

FIG. 4 is a schematic diagram of a control information (for example, downlink control information or uplink control information) transmission procedure suitable to Solution 3 according to an embodiment of the present invention. The procedure may include the following steps.

Step 401: A control information sending device sends, based on a type of a control channel used to send control information, the control information by using a control information format corresponding to the type of the control channel, where a first control channel is corresponding to P first-type control information formats, and a second control channel is corresponding to Q second-type control information formats.

Step 402: A control information receiving device receives the control information sent by the sending device, and further performs corresponding processing based on the received control information.

In this step, downlink control information transmission is used as an example. A terminal may perform blind detection on the first control channel based on a first-type DCI format, to obtain downlink control information sent by using the first control channel. The terminal may perform blind detection on the second control channel based on a second-type DCI format, to obtain downlink control information sent by using the second control channel.

In the foregoing embodiment of the present invention, the control information sending device sends, based on the type of the control channel used to send the control information, the control information by using the control information format corresponding to the type of the control channel, where the first control channel is corresponding to the P first-type control information formats, the second control channel is corresponding to the Q second-type control information formats, and the two types of control information formats differ in at least one of a quantity of control information formats, a maximum bit quantity of a control information format, and a minimum bit quantity of a control information format. In this way, the control information can be sent on different types of control channels by using different types of control information formats. Because the two types of control information formats differ in at least one of the quantity of control information formats, the maximum bit quantity of a control information format, and the minimum bit quantity of a control information format, the control information is sent based on a type of a control channel by using a control information format that adapts to the type, so as to improve performance of control information transmission.

Based on a same technical conception, an embodiment of the present invention further provides a corresponding apparatus.

Figure 5:
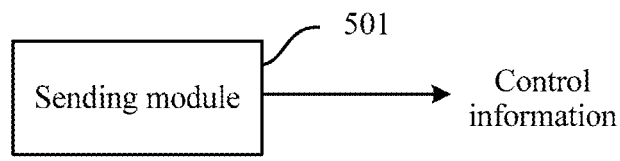
FIG. 5, FIG. 6, FIG. 7, and FIG. 8 are separately schematic structural diagrams of apparatuses applicable to Solution 1 or Solution 2 according to embodiments of the present invention.

FIG. 5 shows a control information sending apparatus according to an embodiment of the present invention. The control information sending apparatus may implement the control information sending procedure provided in Solution 1 or Solution 2. As shown in FIG. 5, the apparatus may include a sending module 501. The sending module 501 is configured to send control information, where the control information is associated with one of at least two transmission schemes, and the control information includes information used to indicate a transmission scheme type. For a specific method for sending the control information by the sending module 501, refer to the foregoing embodiments. Details are not described herein again.

Figure 6:
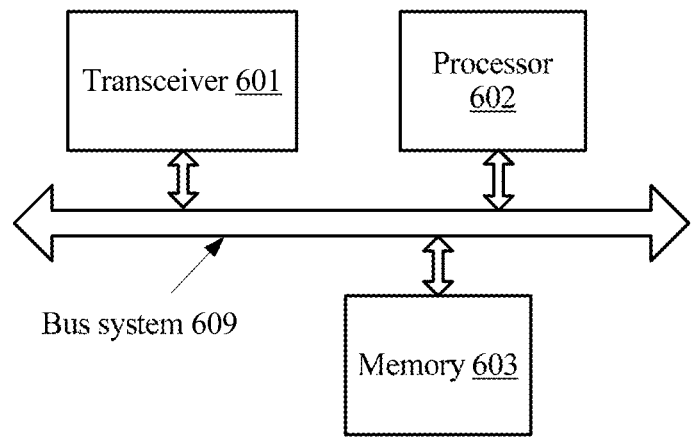

FIG. 6 shows a control information sending apparatus according to an embodiment of the present invention. The control information sending apparatus may implement the control information sending procedure provided in Solution 1 or Solution 2. As shown in FIG. 6, the apparatus may include a transceiver 601, a processor 602, and a memory 603.

The processor 602 is configured to control an operation of the apparatus, including transmitting (including receiving and/or sending) data by using the transceiver 601. The memory 603 may include a read-only memory and a random access memory, and is configured to provide an instruction and data for the processor 602. A part of the memory 603 may further include a non-volatile random access memory (NVRAM). Components of the apparatus are coupled together by using a bus system. In addition to a data bus, a bus system 609 includes a power bus, a control bus, and a status signal bus. However, for clarity of description, various buses are marked as the bus system 609 in the figure.

The procedures disclosed in the embodiments of this application may be applied to the processor 602, or implemented by the processor 602. During implementation, each step of the procedure implemented by the apparatus may be completed by using an integrated logical circuit of hardware in the processor 602 or an instruction in a form of software. The processor 602 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general-purpose processor may be a microprocessor, may be any conventional processor, or the like. The steps of the methods disclosed with reference to the embodiments of this application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 603, and the processor 602 reads information in the memory 603 and implements the steps of the procedure indicated in the embodiments of the present invention in combination with hardware of the processor 602.

Specifically, the processor 602 may be configured to execute the control information sending procedure described in the foregoing embodiments. The procedure may include: sending control information, where the control information is associated with one of at least two transmission schemes, and the control information includes information used to indicate a transmission scheme type. For the procedure executed by the processor 602, refer to the descriptions in the foregoing embodiments. Details are not described herein again.

Figure 7:
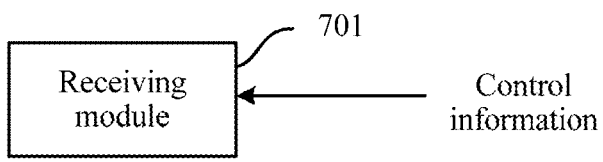

FIG. 7 shows a control information receiving apparatus according to an embodiment of the present invention. The control information receiving apparatus may implement the control information receiving procedure provided in Solution 1 or Solution 2. As shown in FIG. 7, the apparatus may include a receiving module 701. The receiving module 701 is configured to receive control information, where the control information is associated with one of at least two transmission schemes, and the control information includes information used to indicate a transmission scheme type. For a specific method for receiving the control information by the receiving module 701, refer to the foregoing embodiments. Details are not described herein again.

Figure 8:
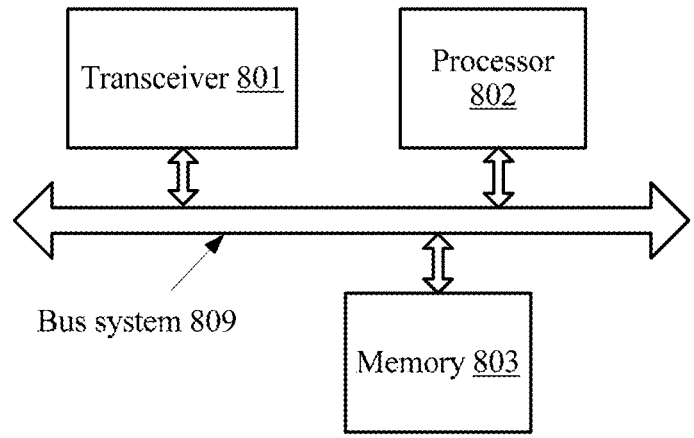

FIG. 8 shows a control information receiving apparatus according to an embodiment of the present invention. The control information receiving apparatus may implement the control information receiving procedure provided in Solution 1 or Solution 2. As shown in FIG. 8, the apparatus may include a transceiver 801, a processor 802, and a memory 803.

The processor 802 is configured to control an operation of the apparatus, including transmitting (including receiving and/or sending) data by using the transceiver 801. The memory 803 may include a read-only memory and a random access memory, and is configured to provide an instruction and data for the processor 802. A part of the memory 803 may further include a non-volatile random access memory (NVRAM). Components of the apparatus are coupled together by using a bus system. In addition to a data bus, a bus system 1209 includes a power bus, a control bus, and a status signal bus. However, for clarity of description, various buses are marked as the bus system 809 in the figure.

The procedures disclosed in the embodiments of this application may be applied to the processor 802, or implemented by the processor 802. During implementation, each step of the procedure implemented by the apparatus may be completed by using an integrated logical circuit of hardware in the processor 802 or an instruction in a form of software. The processor 802 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general-purpose processor may be a microprocessor, may be any conventional processor, or the like. The steps of the methods disclosed with reference to the embodiments of this application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 803, and the processor 802 reads information in the memory 803 and implements the steps of the procedure indicated in the embodiments of the present invention in combination with hardware of the processor 802.

Specifically, the processor 802 may be configured to execute the control information receiving procedure described in the foregoing embodiments. The procedure may include: receiving control information, where the control information is associated with one of at least two transmission schemes, and the control information includes information used to indicate a transmission scheme type. For the procedure executed by the processor 802, refer to the descriptions in the foregoing embodiments. Details are not described herein again.

Figure 9:
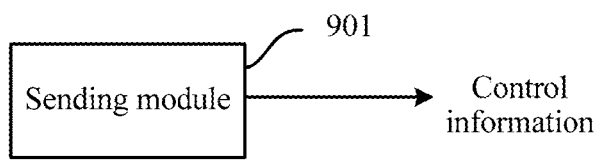
FIG. 9, FIG. 10, FIG. 11, and FIG. 12 are separately schematic structural diagrams of apparatuses applicable to Solution 3 according to embodiments of the present invention.

FIG. 9 shows a control information sending apparatus according to an embodiment of the present invention. The control information sending apparatus may implement the control information sending procedure provided in Solution 3. The apparatus may be a base station. As shown in FIG. 9, the apparatus may include a sending module 901. The sending module 901 is configured to send, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format. For a specific method for sending the control information by the sending module 901, refer to the foregoing embodiments. Details are not described herein again.

Figure 10:
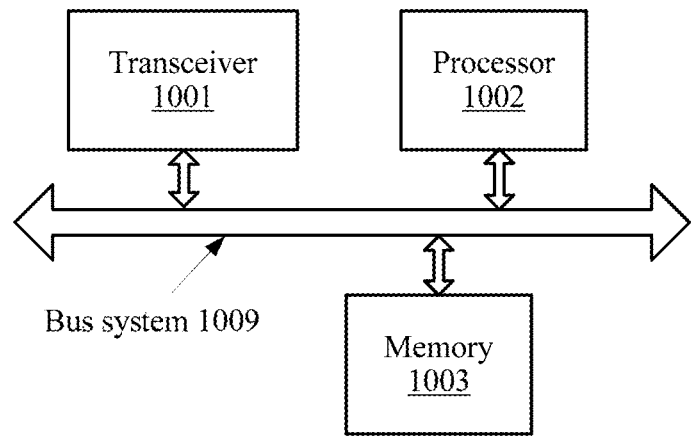

FIG. 10 shows a control information sending apparatus according to an embodiment of the present invention. The control information sending apparatus may implement the control information sending procedure provided in Solution 3. As shown in FIG. 10, the apparatus may include a transceiver 1001, a processor 1002, and a memory 1003.

The processor 1002 is configured to control an operation of the apparatus, including transmitting (including receiving and/or sending) data by using the transceiver 1001. The memory 1003 may include a read-only memory and a random access memory, and is configured to provide an instruction and data for the processor 1002. A part of the memory 1003 may further include a non-volatile random access memory (NVRAM). Components of the apparatus are coupled together by using a bus system. In addition to a data bus, a bus system 1009 includes a power bus, a control bus, and a status signal bus. However, for clarity of description, various buses are marked as the bus system 1009 in the figure.

The procedures disclosed in the embodiments of this application may be applied to the processor 1002, or implemented by the processor 1002. During implementation, each step of the procedure implemented by the apparatus may be completed by using an integrated logical circuit of hardware in the processor 1002 or an instruction in a form of software. The processor 1002 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general-purpose processor may be a microprocessor, may be any conventional processor, or the like. The steps of the methods disclosed with reference to the embodiments of this application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1003, and the processor 1002 reads information in the memory 1003 and implements the steps of the procedure indicated in the embodiments of the present invention in combination with hardware of the processor 1002.

Specifically, the processor 1002 may be configured to execute the control information sending procedure described in the foregoing embodiment. The procedure may include: sending, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and the two types of control information formats differ in at least one of a quantity of control information formats, a maximum bit quantity of a control information format, and a minimum bit quantity of a control information format. For the procedure executed by the processor 1002, refer to the descriptions in the foregoing embodiments. Details are not described herein again.

Figure 11:
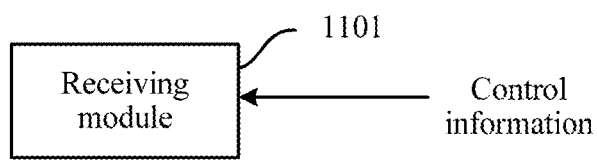

FIG. 11 shows a control information receiving apparatus according to an embodiment of the present invention. The control information receiving apparatus may implement the control information receiving procedure provided in Solution 3. As shown in FIG. 11, the apparatus may include a receiving module 1101. The receiving module 1101 is configured to receive, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and two types of DCI formats differ in at least one of a quantity of control information formats, a maximum bit quantity of a control information format, and a minimum bit quantity of a control information format. For a specific method for receiving the control information by the receiving module 1101, refer to the foregoing embodiments. Details are not described herein again.

Figure 12:
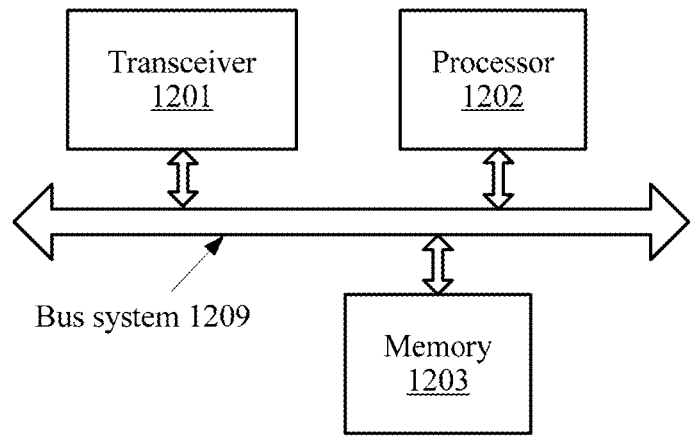

FIG. 12 shows a control information receiving apparatus according to an embodiment of the present invention. The control information receiving apparatus may implement the control information receiving procedure provided in Solution 3. As shown in FIG. 12, the apparatus may include a transceiver 1201, a processor 1202, and a memory 1203.

The processor 1202 is configured to control an operation of the apparatus, including transmitting (including receiving and/or sending) data by using the transceiver 1201. The memory 1203 may include a read-only memory and a random access memory, and is configured to provide an instruction and data for the processor 1202. A part of the memory 1203 may further include a non-volatile random access memory (NVRAM). Components of the apparatus are coupled together by using a bus system. In addition to a data bus, a bus system 809 includes a power bus, a control bus, and a status signal bus. However, for clarity of description, various buses are marked as the bus system 1209 in the figure.

The procedures disclosed in the embodiments of this application may be applied to the processor 1202, or implemented by the processor 1202. During implementation, each step of the procedure implemented by the apparatus may be completed by using an integrated logical circuit of hardware in the processor 1202 or an instruction in a form of software. The processor 1202 may be a general purpose processor, a digital signal processor, an application-specific integrated circuit, a field programmable gate array or another programmable logic device, a discrete gate or a transistor logic device, or a discrete hardware component, and may implement or execute methods, steps, and logic block diagrams that are disclosed in the embodiments of this application. The general-purpose processor may be a microprocessor, may be any conventional processor, or the like. The steps of the methods disclosed with reference to the embodiments of this application may be directly performed and completed by using a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 1203, and the processor 1202 reads information in the memory 1203 and implements the steps of the procedure indicated in the embodiments of the present invention in combination with hardware of the processor 1202.

Specifically, the processor 1202 may be configured to execute the control information receiving procedure described in the foregoing embodiments. The procedure may include: receiving, based on a type of a control channel used to send control information, the control information by using a control information format corresponding to the type of the control channel, where a first control channel is corresponding to P first-type control information formats, a second control channel is corresponding to Q second-type control information formats, both P and Q are integers greater than or equal to 1, and two types of DCI formats differ in at least one of a quantity of control information formats, a maximum bit quantity of a control information format, and a minimum bit quantity of a control information format. For the procedure executed by the processor 1202, refer to the descriptions in the foregoing embodiments. Details are not described herein again.

Based on the foregoing embodiments, an embodiment of this application further provides a computer storage medium. The storage medium stores a software program, and when being read and executed by one or more processors, the software program can implement the methods provided in the foregoing embodiments. The storage medium includes: any medium that can store program code, such as a USB flash drive, a removable hard disk, a read-only memory (read-only memory, ROM), a random access memory (random access memory, RAM), a magnetic disk, or an optical disc.

Based on the foregoing embodiments, an embodiment of this application further provides a computer program product that includes an instruction. When the instruction is run on a computer, the computer performs the method in the foregoing embodiments.

In conclusion, what described above are merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device may implement a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some optional embodiments of the present invention have been described, persons skilled in the art can make changes and modifications to these embodiments once they learn the basic inventive concept. Therefore, the following claims are intended to be construed as to cover the optional embodiments and all changes and modifications falling within the scope of the present invention.

Persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A control information transmission method, comprising:
    sending control information, wherein the control information is associated with one of at least two transmission schemes, and the control information comprises information used to indicate a type of transmission scheme, wherein a control information format of the control information comprises one or more of a third format, a fourth format, and a fifth format, wherein the fifth format indicates control information of common system information, and the third format and the fourth format indicate control information of a user dedicated channel; and
    one part of control information of a first transmission scheme in the at least two transmission schemes is in the third format, and the other part of control information is in the fourth format.

2. The method according to claim 1, wherein the third format is used by control information shared by all the transmission schemes, and the fourth format is used by control information specific to the first transmission scheme.

3. The method according to claim 1, wherein the third format comprises a first information field, and the first information field is used to carry indication information of the fourth format; and
    in the third format used by the control information of the first transmission scheme, the first information field carries first indication information, and the first indication information is used to indicate whether there is the fourth format.

4. The method according to claim 1, wherein the at least two transmission schemes comprise at least two of the following transmission schemes:
    transmit diversity;
    open-loop transmission;
    semi-open-loop transmission; and
    closed-loop transmission.

5. A control information receiving method, comprising:
    receiving control information, wherein the control information is associated with one of at least two transmission schemes, and the control information comprises information indicating a type of transmission scheme, wherein a control information format used by the control information comprises one or more of a first format, a third format, and a fourth format, wherein the first format indicates control information of common system information, and the third format and the fourth format indicate control information of a user dedicated channel; and
    one part of control information of a first transmission scheme in the at least two transmission schemes is in the third format, and the other part of control information is in the fourth format.

6. The method according to claim 5, wherein the third format is used by control information shared by all the transmission schemes, and the fourth format is used by control information specific to the first transmission scheme.

7. The method according to claim 5, wherein the third format comprises a first information field, and the first information field carries indication information of the fourth format; and
    in the third format used by the control information of the first transmission scheme, the first information field carries first indication information, wherein the first indication information indicates that there is the fourth format.

8. The method according to claim 5, wherein the at least two transmission schemes comprise at least two of the following transmission schemes:
    transmit diversity;
    open-loop transmission;
    semi-open-loop transmission; and
    closed-loop transmission.

9. A wireless communications apparatus, comprising a transceiver, a processor, and a memory, wherein
    the memory is configured to store a computer program instruction; and
    the processor is coupled to the memory and is configured to: read the computer program instruction stored in the memory, and to
    send control information, wherein the control information is associated with one of at least two transmission schemes, and the control information comprises information used to indicate a type of transmission scheme, wherein a control information format of the control information comprises one or more of a third format, a fourth format, and a fifth format, wherein the fifth format indicates control information of common system information, and the third format and the fourth format indicate control information of a user dedicated channel; and
    one part of control information of a first transmission scheme in the at least two transmission schemes is in the third format, and the other part of control information is in the fourth format.

10. A wireless communications apparatus, comprising a transceiver, a processor, and a memory, wherein the memory is configured to store a computer program instruction; and the processor is coupled to the memory and is configured to: read the computer program instruction stored in the memory, and to receive control information, wherein the control information is associated with one of at least two transmission schemes, and the control information comprises information indicating a type of transmission scheme, wherein a control information format of the control information comprises one or more of a third format, a fourth format, and a fifth format, wherein the fifth format indicates control information of common system information, and the third format and the fourth format indicate control information of a user dedicated channel; and one part of control information of a first transmission scheme in the at least two transmission schemes is in the third format, and the other part of control information is in the fourth format.

* * * * *